United States Patent [19]
Payne

[11] 3,718,312
[45] Feb. 27, 1973

[54] QUICK CONNECT AND DISCONNECT VALVED COUPLING

[75] Inventor: Leroy C. Payne, La Habra, Calif.

[73] Assignee: Standard Pneumatic Motor Company, Whittier, Calif.

[22] Filed: May 3, 1971

[21] Appl. No.: 139,752

[52] U.S. Cl. ............251/149.4, 251/149.6, 137/231
[51] Int. Cl. ..........................F16l 29/00, F16l 37/28
[58] Field of Search ........251/149.4, 149.6; 137/231, 137/550

[56] References Cited

UNITED STATES PATENTS

| | | | |
|---|---|---|---|
| 2,804,317 | 8/1957 | Prater | 251/149.4 X |
| 2,931,668 | 4/1960 | Baley | 251/149.4 X |
| 3,561,726 | 2/1971 | Iannelli | 251/149.6 |
| 2,896,663 | 7/1959 | Mena | 137/550 X |
| 3,592,439 | 7/1971 | Ritchie, Jr. | 251/149.4 X |

*Primary Examiner*—William R. Cline
*Attorney*—J. Carroll Baisch

[57] ABSTRACT

A pneumatic valve for quick connection and quick disconnection from pneumatic tools and the like. A normally closed valve having a movable valve member, including a valve stem, is disposed in a valve housing. An inlet bushing is screwed into a tapped opening provided therefor in the pneumatic tool and in which a connector nut, rotatably disposed on the valve body, is quickly screwed into and out of the inlet bushing, which has a web thereon engagable by the valve stem of the movable valve member for moving the valve member to the open position when the connector nut is screwed into the inlet bushing. An O-ring is located in a groove in the inlet bushing and provides an effective pneumatic seal between the connector nut and the inlet bushing when the nut is screwed into the connector. The inlet bushing normally is attached to the pneumatic tool and the valve body, with the valve member operably disposed therein, is easily and quickly disconnected from the inlet bushing and, hence, from the pneumatic tool by unscrewing the connector nut from the inlet bushing, the valve automatically closing when the valve is disconnected from the inlet bushing. The valve body with its valve member is as easily and quickly attached to the tool by screwing the connector nut into the inlet bushing, the valve then being automatically opened.

4 Claims, 4 Drawing Figures

PATENTED FEB 27 1973 3,718,312
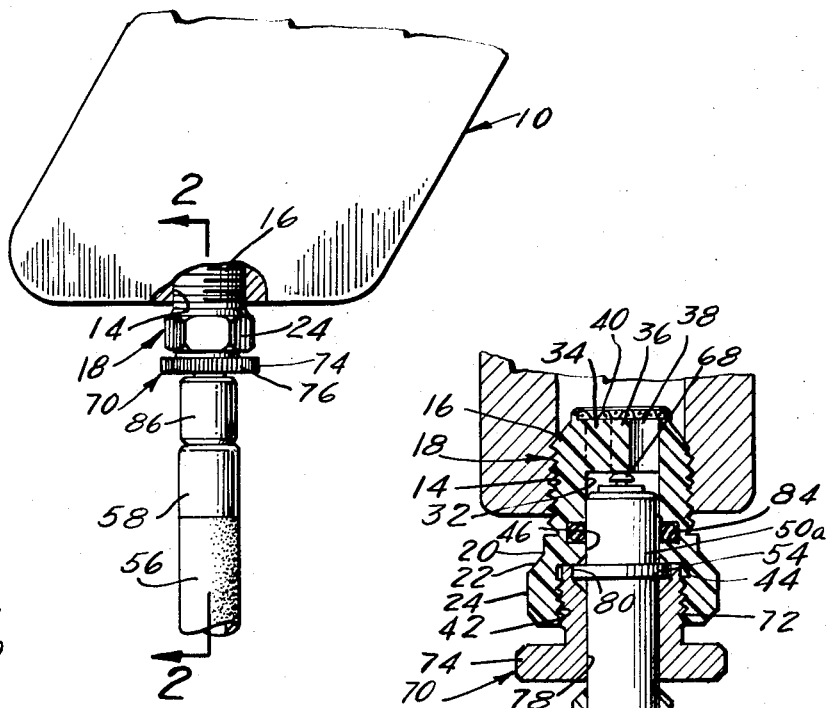
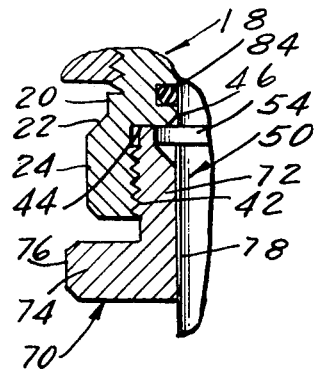
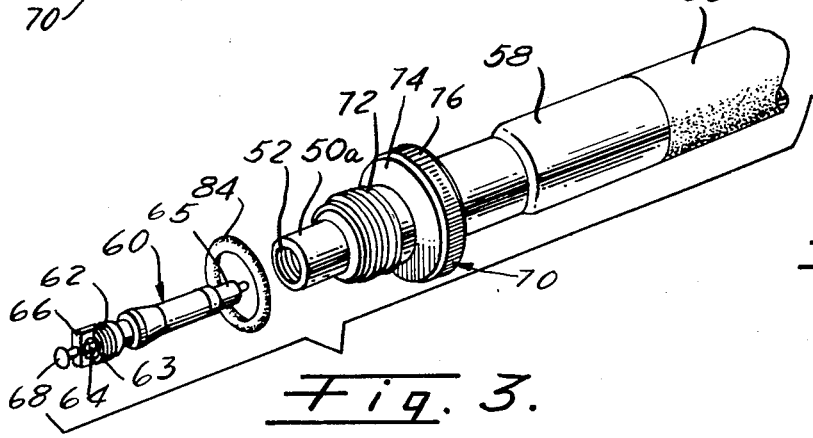
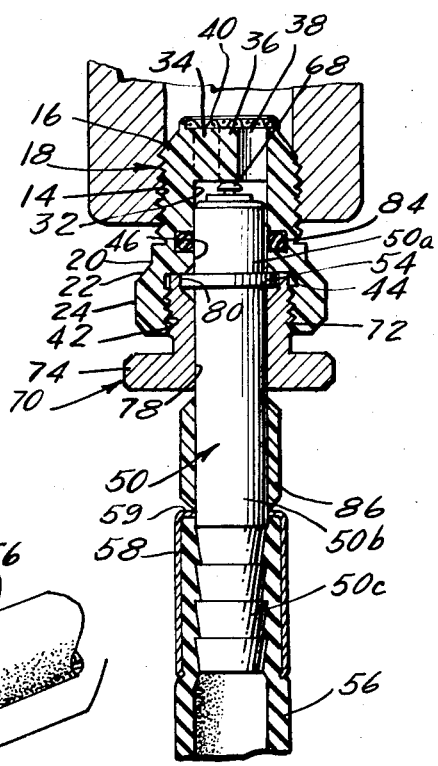
LeRoy C. Payne
INVENTOR
BY *JC Barrel*
Attorney

QUICK CONNECT AND DISCONNECT VALVED COUPLING

BACKGROUND OF THE INVENTION

1. Field of the Invention

The invention relates to pneumatic connectors for connecting a pneumatic conduit to and disconnecting the conduit from pneumatic appliances, such as pneumatic tools and the like.

2. Description of the Prior Art

Many operators of pneumatic tools do not like to have anyone else use such tools and, in order to prevent others from using their pneumatic tools, they disconnect the tools from the pneumatic lines to which they are connected when in use. Normally, disconnecting the tools requires closing a valve in the pneumatic line which may not be right at hand, so time must be taken to step over to the valve and close it. Then, the tool is unscrewed from the pneumatic line. This is somewhat awkward if the tool must be rotated to unscrew it. If the pneumatic conduit, which is usually a rubber hose, is turned to unscrew said conduit from the tool the conduit is twisted and, if it cannot be twisted enough to disconnect the tool, the latter must also be rotated or turned. Connecting the tool to the pneumatic conduit requires the reversal of the above-described procedure. Also required is the use of a wrench for connecting and disconnecting the tool.

The present invention overcomes the difficulties heretofore involved in disconnecting and connecting pneumatic tools to pneumatic lines.

SUMMARY OF THE INVENTION

The present invention comprises means for easily and quickly connecting a pneumatic conduit carrying air under pressure to pneumatically operated appliances, such as pneumatic tools and the like, and easily and quickly disconnecting such conduits from such appliances.

While the present invention has particular utility for use with pneumatic tools and the like, and is shown and described in connection therewith, it is to be understood that its utility is not confined thereto, as it may be used in connection with other pneumatic appliances and the like.

The invention comprises an inlet bushing threadably connected with a pneumatic tool and through which air under pressure is conveyed to the pneumatic motor, or the like, of such tool. Within the flow passage through said bushing there is a web with air passages therepast. A movable valve member, including a valve stem, is operably disposed within a valve housing, said valve member being normally closed and urged toward the closed position by spring means. On the valve housing is rotatably disposed a connector nut adapted to be screwed into and out of the inlet bushing for connecting the valve housing therefrom. As the valve housing is being attached to the inlet bushing by screwing the connector nut into said inlet bushing, the valve stem contacts the web and upon further screwing of said connecting nut into the inlet bushing the valve member is moved to the open position. In other words, the valve is automatically opened when the valve housing, with the movable valve member therein, is attached to the inlet bushing and, hence, to the pneumatic tool so that the latter is supplied with air under pressure.

An O-ring seal is disposed in a groove in the inlet bushing, and when the connector nut is tightened in the inlet bushing there is a secure seal provided between said connector nut valve housing and the inlet bushing.

Unscrewing the connector nut from the inlet bushing effects disconnection of the pneumatic conduit from the tool and as said connector nut is unscrewed the free end of the stem of the movable valve member disengages the web, so that the spring of the valve automatically effects movement of the movable valve member to the closed position.

Since the connector nut is free to rotate on the valve housing and only a few turns of said nut are required to operably connect or disconnect the valve housing from the inlet bushing, connection of the pneumatic conduit to the tool or disconnection thereof from said tool is effected easily and quickly with automatic opening and closing, respectively, of the valve with connection of the nut to the bushing or disconnection of the nut from the bushing.

OBJECTS AND ADVANTAGES OF THE INVENTION

It is an object of the present invention to provide a control valve for appliances operated by air under pressure that is easily and quickly connected to and disconnected from a pneumatic appliance.

It is another object of the invention to provide a device of this character that automatically cuts off the air flow when disconnected from the appliance and which automatically opens to permit air under pressure to be supplied to the appliance when connected thereto.

Still another object of the invention is to provide a device of this character that is simple in construction and operation and that is relatively inexpensive to manufacture.

A further object of the invention is to provide a device of this character which eliminates the need for a wrench, since a finger-tight connection is sufficient, the swivel action preventing loosening once it is installed in the tool.

A still further object of the invention is to provide a device of this character which allows the tool to be turned or swiveled without causing the air hose to coil or kink.

Another object of the invention is to provide a device or apparatus of this character that is relatively light in weight.

The characteristics and advantages of the invention are further sufficiently referred to in connection with the following detailed description of the accompanying drawings, which represent one embodiment. After considering this example, skilled persons will understand that many variations may be made without departing from the principles disclosed and I contemplate the employment of any structures, arrangements or modes of operation that are properly within the scope of the appended claims.

BRIEF DESCRIPTION OF THE DRAWINGS

Referring to the drawings, which are for illustrative purposes only:

FIG. 1 is a side view of a part of a pneumatic tool with the invention operably connected thereto;

FIG. 2 is an enlarged sectional view taken on line 2—2 of FIG. 2;

FIG. 3 is an enlarged exploded perspective view of the device; and

FIG. 4 is an enlarged partial sectional view of the invention.

DESCRIPTION OF THE PREFERRED EMBODIMENT

Referring more particularly to the drawings, there is shown, FIG. 1, the handle, indicated generally at 10, of a pneumatic tool, a portion of said handle being broken away to show the threaded opening 14 for reception of an externally threaded end portion 16 of an inlet bushing, indicated generally at 18. The inlet bushing has an unthreaded body part 20 of slightly greater diameter than the diameter of the threaded part and from which said threaded part extends in what is termed forwardly herein. From the outer end of the body part 20 said bushing flares outwardly at 22 and terminates at its outer end in a nut part 24 for attachment of a suitable wrench or other tool to tighten or loosen said inlet bushing or to hold same against turning.

The inlet bushing has a fluid flow passage 32 therein, within which there is a spider or web 34 having a solid central portion 36 with air passages 38 through said web outwardly of said central portion 36, said central portion 36 functioning as a fixed stop. A screen 40 is disposed in the end of the passage 32 forwardly of the web 34, said screen being secured in place by any suitable means such as press fitting or the like. The forward end portion of the externally threaded part 16 of the inlet bushing is connected to conduit means, not shown, within the tool, said conduit means being operably connected with the motor or the like (not shown) of the tool.

At its rear end the inlet bushing has an enlarged tapped bore 42, at the inner end of which there is an annular internal shoulder 44, the bore 42 and opening 46 defined by the shoulder being in axial alignment with each other and with the passage 32.

Normally, the inlet bushing is attached to the tool and remains attached unless it must be removed for servicing the tool or the like.

The invention also includes a tubular valve housing, indicated generally at 50, which has a longitudinally extending bore therethrough, the forward end of said bore being tapped as at 52. Housing 50 has an annular, external, radial flange 54 adjacent the forward end but spaced rearwardly therefrom to provide a forward end portion 50a. There is a portion 50b rearwardly of the flange 54, the portion 50b having an outer end part 50c formed with a series of shoulders to provide secure sealing engagement with the interior of a flexible conduit 56 of any suitable material such as rubber, plastic or the like, a band 58 being press fitted on the conduit 56 over the part thereof in which the housing part 50c is disposed, said band having an inturned flange 59 covering the adjacent end of the conduit 56.

A valve core, indicated generally at 60, is provided at the forward end of the housing 50. Said valve may be of any well known type but is shown as what is known as a "Dill" valve which has an externally threaded part 62 that is screwed into the tapped end part 52 of the passage through the housing 50. There is a spring 63 within the valve core 60 which urges the movable valve member 65 to the closed or seated position, said valve member being normally in the closed or seated position. There is a valve stem 64 for said movable valve member extending through a bore provided therefor in a guide 66, which is part of externally threaded part 62, said valve stem having an enlarged head 68 at the forward end which is spaced from the end of the guide 66 so that said stem may be moved inwardly to effect opening of the movable valve member.

When the valve core 60 is operably positioned within the housing 50 the stem projects forwardly of the adjacent end of the housing so that, when the housing is secured within the inlet bushing, the head 68 will engage the central part 36 of the web and be moved inwardly to move the movable valve member to the open or unseated position as said housing is installed in said inlet bushing as hereinabove described.

A connector nut, indicated generally at 70, is rotatably disposed on the housing part 50b, said connector nut comprising a body 72 that is externally threaded. At the outer end of said body 72 there is an integral annular flange 74 that extends radially outwardly and has its peripheral edge 76 knurled. The connector nut has a bore 78 therethrough for operable reception of the part 50b of the housing and at the forward end there is a counter bore 80 for reception of the flange 54.

An O-ring 84 is positioned in the groove in the inlet bushing. When the connector nut is tightened the O-ring makes a seal between the valve housing and the inlet bushing.

A spacer 86 is disposed on the housing part 50b to space the end of the conduit 56 from the connector nut.

When the connector nut 70 is screwed into the inlet bushing the head 68 of the valve stem 64 engages the web 34 and, with continued screwing of said connector nut into the inlet bushing, the valve stem is moved inwardly to effect movement of the movable valve member at the inner end of said stem to the open position so that air under pressure from the conduit 56 will pass through the air passages 38, through the web and thence to the pneumatically operated mechanism of the appliance or tool, such as an air driven motor, to effect operation thereof.

Unscrewing the connector nut from the inlet bushing effects disconnection of the pneumatic conduit 56 from the appliance or tool and, as said connector nut is unscrewed, the head 68 of the valve stem 64 moves out of contact with the web so that the spring of the valve core automatically effects movement of the movable valve member of the valve core to the closed position, thereby cutting off the flow of air from the conduit 56.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example, and I do not wish to be restricted to the specific form shown or uses mentioned except as defined in the accompanying claims.

I claim:

1. Quick connect and disconnect means, comprising:
   A. an inlet bushing for attachment to a pneumatically operated appliance or the like, said bushing having a liquid passage therethrough, and a. a fixed web disposed in said fluid passage, said web having a central part and openings for fluid flow past said central part, b. an internal annular flange in the passage of said inlet bushing defining an opening coaxial with said passage and spaced rearwardly of the web, c. said passage in the inlet bushing having an enlarged and tapped bore at the rear thereof;

B. a tubular valve housing having a fluid flow passage therethrough, and an external annular flange on said tubular valve housing adjacent to but spaced from the forward end of said housing, the portion of the housing forwardly of the flange being removably disposed in the opening defined by the internal flange of the inlet bushing and a portion of the passage through said bushing rearwardly of the web, a forward end portion of the passage through the housing being tapped;

C. a valve core having an externally threaded part screwed into the tapped forward end portion of the housing passage, said valve core including:

a. a movable valve member, b. a spring normally closing said movable valve member, c. and a valve stem for said movable valve member, said valve stem extending forwardly of the forward end of the valve housing when said valve core is operably positioned in the passage through the valve housing;

D. and a connector nut having a bore therethrough for operable reception of the valve housing and an externally threaded body portion screwed into the enlarged tapped bore of the inlet bushing, and an annular radial flange at the rear thereof, the forward end of the connector nut having a connector bore for reception of the external flange of the valve housing, said forward end of the connector nut being in substantially the same plane as the forward side of the external flange of the valve housing;

E. and an O-ring seal between the valve housing and inlet bushing, the forward projecting end of the valve stem engaging the central part of the web when the connector nut is partially screwed into the tapped part of the inlet bushing and upon further screwing inwardly of the encounter nut the valve stem is moved to unseat the valve member of the valve core, said valve member being seated by the spring therefor when the connector nut is unscrewed.

2. The invention defined by claim 1, including a filter at the forward end of the passage of the inlet bushing.

3. The invention defined by claim 1, including a flexible conduit on a rear part of the valve housing; means for securing said flexible conduit on said rear part of said valve housing and a spacer between the flange of the connector nut and the adjacent end of the flexible conduit.

4. The invention defined by claim 3, wherein the means for securing the flexible conduit on the valve housing comprises a band with an inturned flange at the forward end extending over the adjacent end of the flexible conduit.

* * * * *